United States Patent [19]

Jenkins et al.

[11] Patent Number: 4,859,891
[45] Date of Patent: Aug. 22, 1989

[54] SUBSLOT LINER FOR ROTOR OF DYNAMOELECTRIC MACHINE

[75] Inventors: Thomas B. Jenkins, Schenectady; Dennis R. Ulery, Ballston Spa; Blake W. Wilson, Scotia; Steven C. Walko, Clifton Park, all of N.Y.; Lester H. Lee, Leominster, Mass.; Robert P. Salerno, Everett, Mass.; Robert W. Nason, Beverly, Mass.; John P. Courtney, Lynnfield, Mass.

[73] Assignee: General Electric Company, Schenectady, N.Y.

[21] Appl. No.: 179,156

[22] Filed: Apr. 8, 1988

[51] Int. Cl.$^4$ .............................................. H02K 3/34
[52] U.S. Cl. ..................................... 310/215; 310/61; 310/42
[58] Field of Search ................. 310/59, 60 A, 61, 194, 310/214, 215, 261, 42; 336/60, 196, 210

[56] References Cited

U.S. PATENT DOCUMENTS 4,152,610  5/1979  Wallenstein ........................... 310/61
4,282,450  8/1981  Eckels ................................... 310/215
4,308,476  12/1981  Schuler ............................... 310/215
4,321,498  3/1982  Vogt .................................... 310/215

FOREIGN PATENT DOCUMENTS 0131704  10/1979  Japan ..................................... 310/61

Primary Examiner—Patrick R. Salce
Assistant Examiner—Judson H. Jones
Attorney, Agent, or Firm—Jerome C. Squillaro

[57] ABSTRACT

A U-shaped subslot liner is disposed in the bottom of a slot in the rotor of a dynamoelectric machine. A stack of conductors and insulating layers is supported by arms of the subslot liner durig manufacture. The subslot liner, together with the lower conductor, defines a coolant channel for conveying a gaseous coolant to the conductors. A slot armor lines the sides of the slots where it is retained against centrifugal acceleration by the subslot liner. In one embodiment, the slot armor passes completely under the subslot liner. In other embodiments, the slot armor is in two pieces, each affixed to the subslot liner.

11 Claims, 5 Drawing Sheets

SUBSLOT LINER FOR ROTOR OF DYNAMOELECTRIC MACHINE

BACKGROUND OF THE INVENTION

The present invention relates to dynamoelectric machines and, more particularly, to field rotors of large dynamoelectric machines.

One type of large dynamoelectric machine employs a forged rotor of magnetic material into which slots are machined to contain metallic current-carrying field conductors interconnected to produce a desired magnetic flux pattern. The rotor is rotated on an axis to cause the flux pattern to interact with conductors in a stator, whereby electric power is generated in response to rotational torque (in a generator) or a torque is generated in response to input electric energy.

The magnitude of the field flux which may be generated in the rotor is limited by the permissible maximum current in the field conductors. This limit is related to the temperature to which the field windings can be exposed. The maximum current can be increased by providing means for dissipating heat from the windings. One technique for cooling, with which the present invention is concerned, includes flowing a coolant gas in ventilation passages in subslots in the rotor located below the slots containing the windings. Flow channels pass from the subslots radially outward through coolant openings in the windings to dissipate resistive heating losses from the windings.

It is conventional to form a subslot with a smaller cross section than the conductor-containing main slot. A subslot cover between the subslot and the main slot supports the conductors, and other elements above it, provides insulation to ground for the conductors and provides an interface with slot armor lining the main slot.

Machining of rotor slots is complicated by the need to form two slot widths in each slot, namely, the conductor-carrying slot and the narrower subslot. In addition, the subslot cover requires machined holes therein to permit the coolant gas flowing therein to pass from the subslot into the windings. In addition, the requirement that the subslot cover provide an interface between slot armor lining the main slot, as well as electrical insulation to ground, results in a subslot cover having complex geometry and resultant high cost.

OBJECTS AND SUMMARY OF THE INVENTION

It is an object of the invention to provide a technique for forming a ventilation passage in a slot in a rotor of a dynamoelectric machine which overcomes the drawbacks of the prior art.

It is a further object of the invention to provide a subslot liner for a rotor of a dynamoelectric machine which replaces the functions of the subslot cover in conventional machines It is a still further object of the invention to provide a subslot liner for a rotor of a dynamoelectric machine, wherein extremities of an upward-opening shape support windings disposed in the slot, particularly during assembly of the rotor.

It is a still further object of the invention to provide a subslot liner for a rotor of a dynamoelectric machine including means for interfacing with a slot armor.

Briefly stated, the present invention provides a U-shaped subslot liner disposed in the bottom of a slot in the rotor of a dynamoelectric machine. A stack of conductors and insulating layers is supported by arms of the subslot liner during manufacture. The subslot liner, together with the lower conductor, defines a coolant channel for conveying a gaseous coolant to the conductors. A slot armor lines the sides of the slots where it is retained against centrifugal acceleration by the subslot liner. In one embodiment, the slot armor passes completely under the subslot liner. In other embodiments, the slot armor is in two pieces, each affixed to the subslot liner.

According to an embodiment of the invention, there is provided a rotor for a dynamoelectric machine, comprising: the rotor including a plurality of longitudinal slots therein extending radially into the rotor, a plurality of conductors in each slot, a subslot liner below the plurality of conductors, the subslot liner including first and second arms extending radially outward toward the plurality of conductors, the subslot liner, together with a lower one of the plurality of conductors defining a coolant opening below the plurality of conductors, the first and second arms supporting the plurality of conductors at least during assembly of the rotor, a slot armor extending radially along first and second sides of the slot between the slot and the plurality of conductors, first means for retaining a radially inner portion of the slot armor against outward urging by centrifugal acceleration, and second means for retaining the plurality of conductors in the slot against outward urging by centrifugal acceleration.

The above, and other objects, features and advantages of the present invention will become apparent from the following description read in conjunction with the accompanying drawings, in which like reference numerals designate the same elements

DETAILED DESCRIPTION OF THE PREFERRED EMBODIMENT

Figure 1:
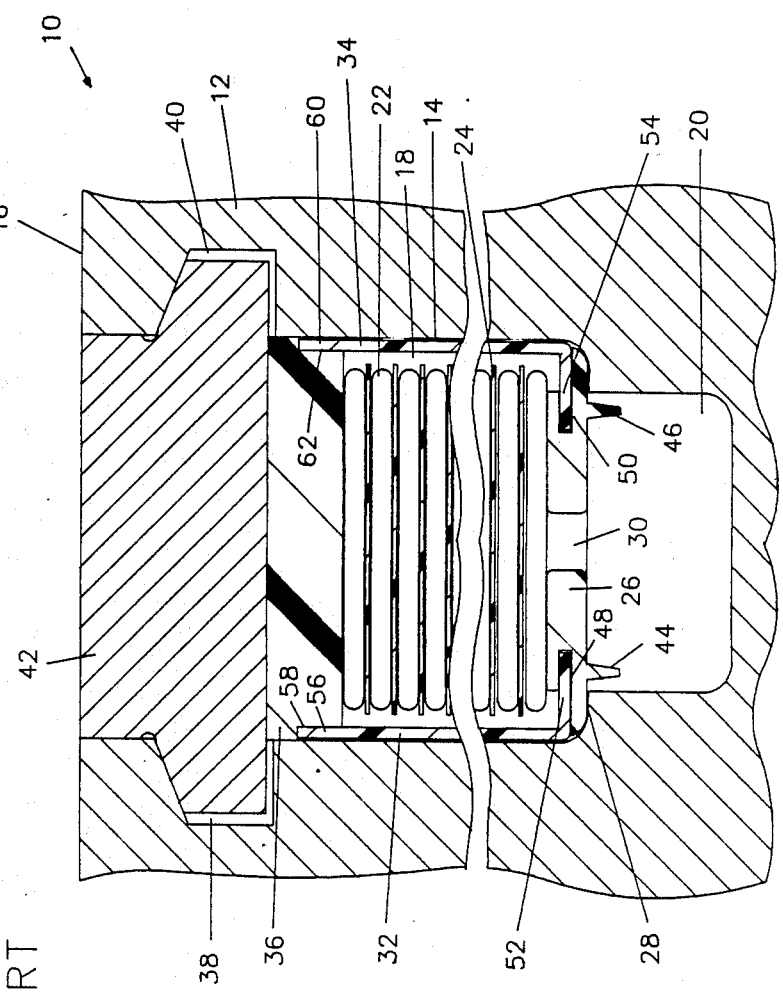
FIG. 1 is a cross section of a slot in a rotor of a dynamoelectric machine showing a subslot cover according to the prior art.

Referring to FIG. 1, a rotor 10 of a prior art dynamoelectric machine includes a rotor forging 12 (only part of which is shown) including a plurality of longitudinal slots 14 (one of which is shown) disposed therein. For reference, a peripheral outer surface 16 of rotor forging 12 is identified in the figure.

Slot 14 includes a main portion 18 and a subslot 20. Conventionally, a width of subslot 20 is less than that of main portion 18. A plurality of conductors 22, mutually insulated by intermediate insulating layers 24, are disposed in main portion 18. A subslot cover 26 rests on a shoulder 28 defined by the different widths of main portion 18 and subslot 20. A coolant opening 30 is disposed generally centered in subslot cover 26. A flow of a coolant gas in subslot 20 passes through coolant opening 30 whence it travels through conventional coolant openings (not shown) in conductors 22, insulating layers 24, creepage block 36 and dovetail wedge 42 toward peripheral outer surface 16. Air or hydrogen is usually used as a coolant gas.

A slot armor, made up of slot armor halves 32 and 34, lines slot 14 to prevent grounding of conductors 22 to rotor forging 12. A conventional creepage block 36 is disposed atop the stack made up of conductors 22 and insulating layers 24 to prevent electrical creepage from conductors 22 to dovetail wedge 42. First and second dovetail slots 38 and 40 engage a dovetail wedge 42 for resisting the radially outward (upward in the figure) centrifugal urging when rotor 10 is in its normal rapid rotation thereby securing the entire contents of slot 14 in place.

Subslot cover 26 includes legs 44 and 46 to prevent electrical creepage from the bottom conductor of conductors 22 to the sides of slot 14. In addition, subslot cover 26 includes first and second edge slots 48 and 50. Edge slot 48 receives an end of a right-angle portion 52 of slot armor half 32. Similarly, edge slot 50 receives an end of a right-angle portion 54 of slot armor half 34. An upper end 56 of slot armor half 32 is fitted into a recess 58 in an edge of creepage block 36. Similarly, an upper end 60 of slot armor half 34 is fitted into a recess 62 in the opposed edge of creepage block 36. In other embodiments, recesses 58 and 60 may be omitted, with slot armor halves extending nearly the full distance to dovetail wedge 42.

Slot armor halves 32 and 34 are either rigid or non-rigid. Rigid types of slot armor include a fiber matrix in a cured resin binder. Non-rigid types include, for example, a non-woven paper-like polyamid material sold under the trademark Nomex. Particularly when a non-rigid slot armor is used, means are necessary to prevent slot armor halves 32 and 34 from migrating radially outward (upward in the figure) under the influence of centrifugal acceleration. In the embodiment shown, such means is provided by bonding or cementing right-angle portions 52 and 54 into edge slots 48 and 50, respectively. The rigidity of rigid slot armor reduces the necessity for bonding or cementing right-angle portions 52 and 54, but such bonding or cementing may be performed to improve resistance to centrifugal acceleration.

As noted in the description of the background of the invention, the prior-art device shown in FIG. 1 requires a relatively complex, and consequently expensive, device to perform the function of subslot cover 26. In addition, the conventional requirement that subslot 20 have a smaller width than main portion 18 adds complication and cost to the machining required to fabricate slot 14. We have identified the functions of subslot cover 26 to consist of the following: supporting conductors 22 and insulating layers 24 during manufacture of rotor 10, supporting slot armor halves 32 and 34 against centrifugal acceleration during operation, and insulating conductors 22 from rotor forging 12 during operation. It turns out that centrifugal acceleration urges conductors 22 and insulating layer 24 radially outward during operation. Accordingly, the function of supporting conductors 22 and insulating layers 24 against downward (radially inward) force is required only during manufacture, wherein such force is exerted to compact conductors 22 within rotor forging 12. We then discovered that all of the functions of subslot cover 26 can be performed in a different manner that simplifies machining and assembly, while carrying out or improving the required functions.

Figure 2:
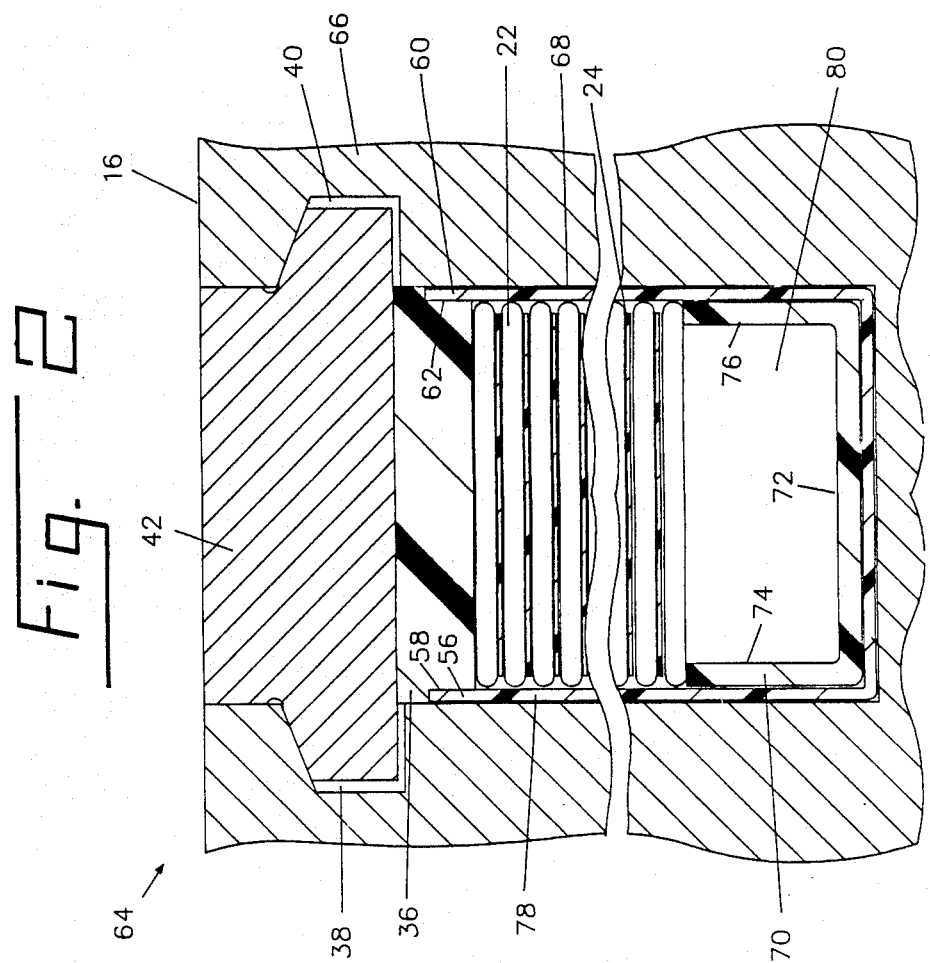
FIG. 2 is a cross section of a slot in a rotor of a dynamoelectric machine showing a subslot liner according to an embodiment of the invention.

Referring now to FIG. 2, a rotor 64 according to an embodiment of the invention, includes a rotor forging 66 having a plurality of longitudinal slots 68 (only one of which is shown) therein. It will be noted that slot 68 has a generally uniform width from top to bottom. A U-shaped subslot liner 70 includes a bottom 72 and first and second arms 74 and 76. A one-piece slot armor 78 passes completely under arm 74. Conductors 22 and insulating layers 24 are initially supported on the extremities of arms 74 and 76 during manufacture. During use, no further substantial support is required. Slot armor 78 optionally may be bonded or cemented to the exterior of U-shaped subslot liner 70.

U-shaped subslot liner 70, together with the bottom conductor 22, forms a coolant channel 80. The conventional, but unillustrated, coolant channels through conductors 22 and insulating layers 24 permit coolant from coolant channel 80 to pass therethrough.

It will be noted that, since slot armor 78 passes completely under U-shaped subslot liner 70, resistance to radially outward migration of slot armor 78 is prevented. This is especially desirable with non-rigid slot armor. Also, since slot armor 78 passes completely about conductors 22 and U-shaped subslot liner 70, creepage paths to ground, which may be experienced in the prior-art device of FIG. 1, are prevented.

In a further embodiment based on FIG. 2, U-shaped subslot liner 70, instead of being an insulating material, may be a conducting material such as, for example, copper. In such an embodiment, U-shaped subslot liner 70 may be used as a conductor. An insulator (not shown) is required between arms 74 and 76 and the bottom one of conductors 22.

Figure 3:
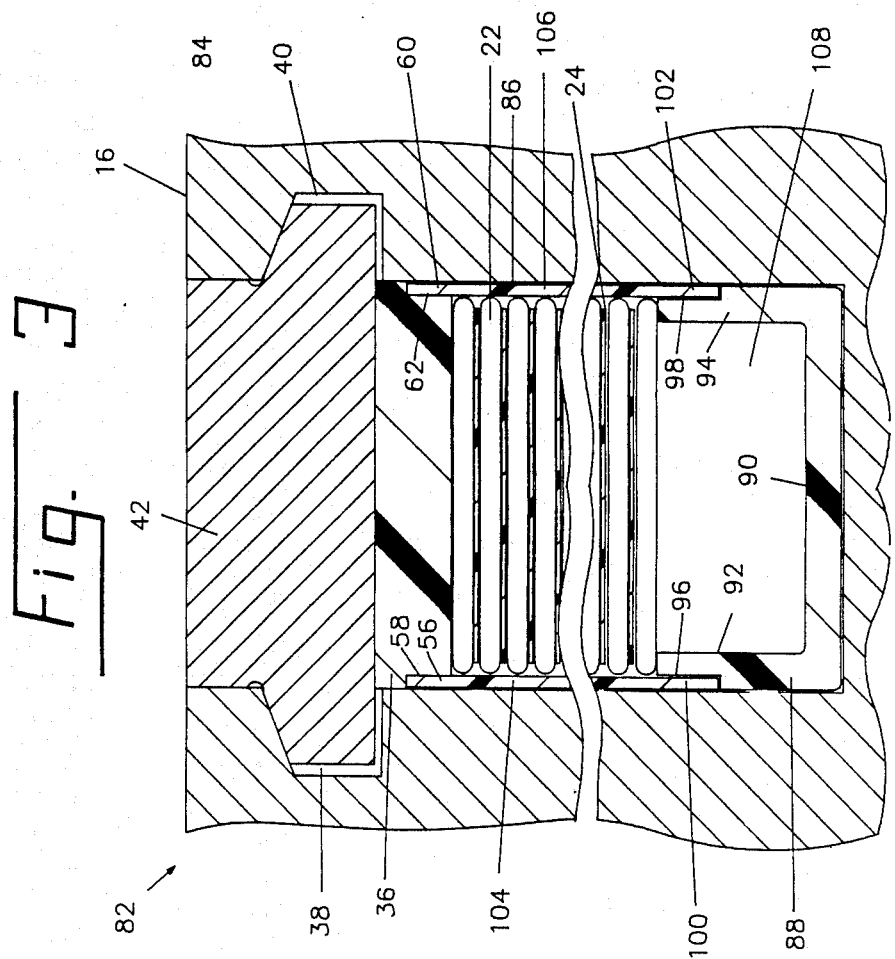
FIG. 3 is a cross section of a slot in a rotor of a dynamoelectric machine showing a subslot liner according to a further embodiment of the invention.

Referring now to FIG. 3, a rotor 82 according to another embodiment of the invention includes a rotor forging 84 having a plurality of slots 86 therein (only one of which is shown). A U-shaped subslot liner 88 having a bottom 90 and first and second arms 92 and 94. Arms 92 and 94 have recesses 96 and 98 into which ends 100 and 102 of slot armor halves 104 and 106, all respectively, are bonded, cemented, or otherwise affixed. As in the previous embodiment, U-shaped subslot liner 88, together with the bottom conductor 22, defines a coolant channel 108.

Although the embodiment of FIG. 3 lacks the feature of a slot armor wrapping around a U-shaped subslot liner, and thus requires affixing slot armor halves 104 and 106 to U-shaped subslot liner 88, in some applications, it is believed that this is satisfactory and that bonding technology for retaining slot armor halves 104 and 106 against centrifugal acceleration is satisfactory.

Figure 4:
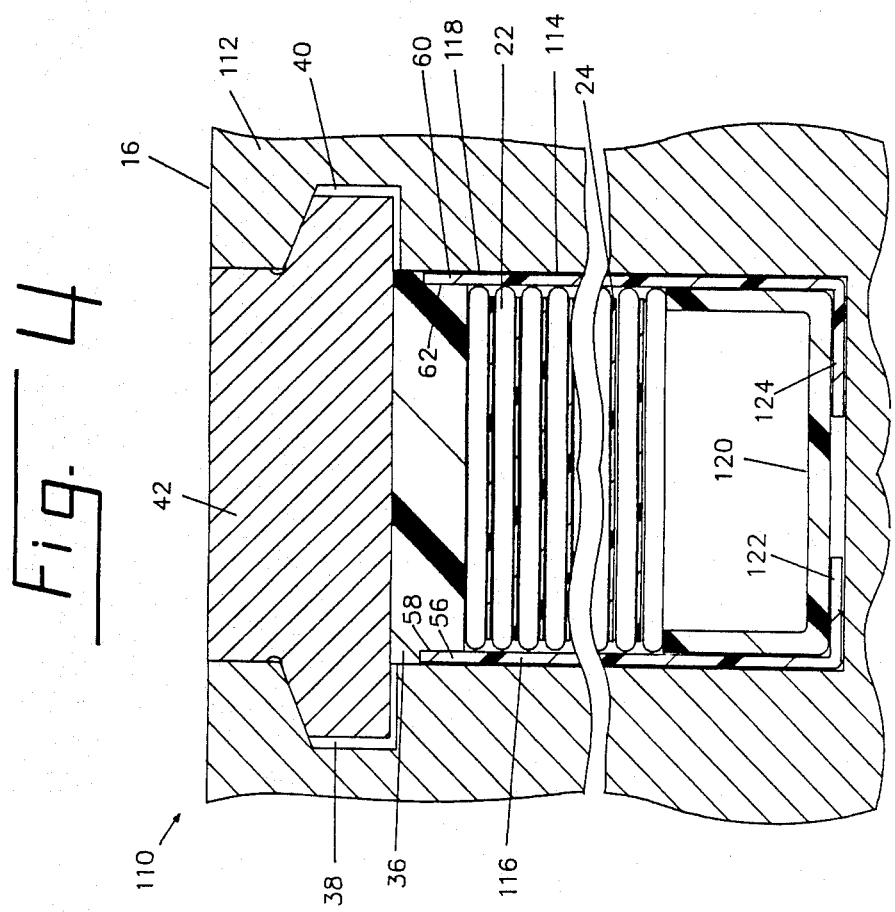
FIG. 4 is a cross section of a slot in a rotor of a dynamoelectric machine showing a subslot liner according to a still further embodiment of the invention.

Referring now to FIG. 4, a rotor 110 according to a still further embodiment of the invention includes a rotor forging 112 having a plurality of slots 114 therein, as in previous embodiments. A slot armor consists of first and second slot armor halves 116 and 118. A U-shaped subslot liner 120 is disposed in the bottom of slot 114, as in previous embodiments. A wrap portion 122 of slot armor half 116 passes partway below U-shaped subslot liner 120 and is affixed thereto by any convenient means. Similarly, a wrap portion 124 of slot armor half 118 passes partway below U-shaped subslot liner 120 and is also affixed thereto by any convenient means.

In other respects, rotor 110 is similar to previous embodiments, and further description thereof is omitted herefrom.

Figure 5:
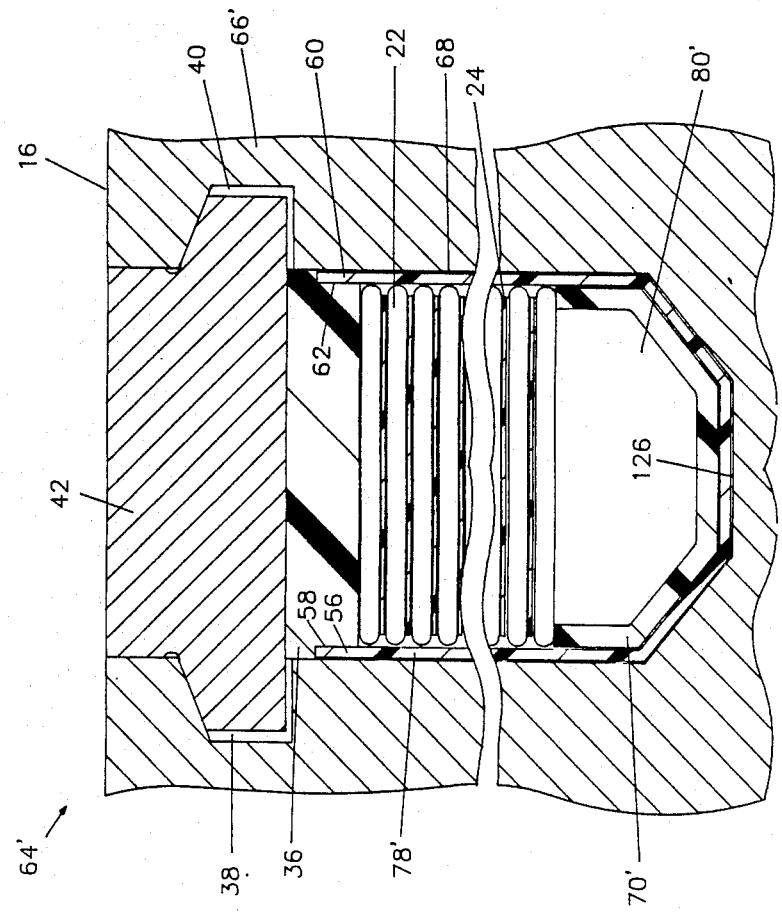
FIG. 5 is a cross section of a slot in a rotor corresponding to FIG. 2 except that the bottom of the slot and the slot liner have a trapezoidal shape.

One skilled in the art will recognize that the embodiments of the invention wherein a single width is employed for the slots is not a necessary limitation on the invention. The greatest concentration of stress from centrifugal acceleration exists at the bottoms of the slots. In some rotors, the bottoms of the slots should be narrower than the radially outer portions in order to retain greater strength in this region. The scope of the present invention is intended to include such embodiments Referring now to FIG. 5, one embodiment of a rotor 64' is shown, similar to that of FIG. 2, except that slot 68' includes a generally trapezoidal bottom surface 126. A U-shaped subslot liner 70' and a slot armor 78' conform to this shape to form a coolant channel 80' having a generally trapezoidal cross section. The angled portions of slots 68' provide increased metal for additional strength in this highest-stress region to resist radially outward acceleration. Other shapes of the bottoms of slots may include Vee, arc, arc with extended arms and elliptical.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims

What we claim is:

1. A rotor for a dynamoelectric machine, comprising:
    said rotor including a plurality of longitudinal slots therein extending radially into said rotor;
    a plurality of conductors in each of said slots;
    a subslot liner below said plurality of conductors;
    said subslot liner including first and second arms extending radially outward toward said plurality of conductors;
    said subslot liner, together with a lower one of said plurality of conductors defining a coolant opening below said plurality of conductors;
    said first and second arms supporting said plurality of conductors at least during assembly of said rotor;
    a slot armor extending radially along first and second sides of said slot between said slot and said plurality of conductors;
    first means for retaining a radially inner portion of said slot armor against outward urging by centrifugal acceleration; and
    second means for retaining said plurality of conductors in said slot against outward urging by centrifugal acceleration 2. A rotor according to claim 1, wherein said subslot liner includes a generally U-shaped cross section.

3. A rotor according to claim 1, wherein said first means includes said slot armor being in a single piece and a middle portion thereof is wrapped about a bottom and sides of said slot liner.

4. A rotor according to claim 1, wherein said first means includes:
    said slot armor includes first and second slot armor halves;
    first means for affixing said first half to said first arm; and
    second means for affixing said second half to said second arm.

5. A rotor according to claim 4, wherein said first and second means for affixing includes bonding.

6. A rotor according to claim 4 wherein said first and second means for affixing includes at least an extremity of said first and second slot armor halves being disposed under said slot liner.

7. A rotor according to claim 1, wherein said first means includes:
    said first means includes a first end portion bent under a radially inner portion of said slot liner; and
    said second means includes a second end portion bent under a radially inner portion of said slot liner.

8. A rotor according to claim 7, wherein said first means further includes means for bonding said first and second halves to said slot liner.

9. A rotor according to claim 1 wherein said slot has a uniform width.

10. A rotor according to claim 1, wherein said slot includes a trapezoidal radially inner portion.

11. A rotor according to claim 1 wherein an inner portion of said slot is reduced in a region of said coolant opening.

* * * * *